(12) United States Patent
Tomasini et al.

(10) Patent No.: US 11,093,233 B2
(45) Date of Patent: Aug. 17, 2021

(54) FIRMWARE OVER-THE-AIR (FOTA) UPDATE FOR BUILDING SERVICES

(71) Applicant: TRIDONIC GMBH & CO KG, Dornbirn (AT)

(72) Inventors: Martin Tomasini, Rovereto (IT); Giulio Borsoi, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 115 days.

(21) Appl. No.: 16/610,961

(22) PCT Filed: Apr. 30, 2018

(86) PCT No.: PCT/EP2018/061030
§ 371 (c)(1),
(2) Date: Nov. 5, 2019

(87) PCT Pub. No.: WO2018/206337
PCT Pub. Date: Nov. 15, 2018

(65) Prior Publication Data
US 2020/0104115 A1 Apr. 2, 2020

(30) Foreign Application Priority Data
May 10, 2017 (DE) ...................... 10 2017 207 871.5

(51) Int. Cl.
*G06F 9/44* (2018.01)
*G06F 8/65* (2018.01)
(Continued)

(52) U.S. Cl.
CPC ................ *G06F 8/65* (2013.01); *H04W 4/20* (2013.01); *H04W 4/33* (2018.02); *G06F 9/4401* (2013.01); *H04W 84/22* (2013.01)

(58) Field of Classification Search
None
See application file for complete search history.

(56) References Cited

U.S. PATENT DOCUMENTS 5,023,832 A * 6/1991 Fulcher, Jr. ............ G05B 15/02
6,785,707 B2    8/2004 Teeple
(Continued)

FOREIGN PATENT DOCUMENTS

CA    2970362    12/2017
DE    102014012257    8/2015
(Continued)

OTHER PUBLICATIONS

PCT search report dated Aug. 17, 2018 in parent application PCT/EP2018/061030.

*Primary Examiner* — Anna C Deng
(74) *Attorney, Agent, or Firm* — Andrus Intellectual Property Law

(57) ABSTRACT

The invention relates to a firmware over-the-air (FOTA) method for updating building services, in particular lighting technology installations, comprising multiple devices which are connected to a server as a mesh network, wherein the method comprises the following steps: storing a firmware update image sent by the server in a respective memory of each device, and triggering the copying of the firmware update from the memory to an internal memory of a microcontroller of each of the devices by means of a trigger command issued by the server, wherein, within a predefined time period (timeout) after the trigger command is issued, the server uses feedback from the devices to check whether each device has received the firmware update image and the trigger command, and wherein the copying does not take place until after the predefined time period has elapsed.

4 Claims, 1 Drawing Sheet

(51) Int. Cl.
*H04W 4/33* (2018.01)
*H04W 4/20* (2018.01)
G06F 9/4401 (2018.01)
H04W 84/22 (2009.01)

(56) References Cited

U.S. PATENT DOCUMENTS

| | | | |
|---|---|---|---|
| 6,832,373 | B2 | 12/2004 | O'Neill |
| 6,941,453 | B2 * | 9/2005 | Rao ............................ G06F 8/65 713/2 |
| 6,987,453 | B1 | 1/2006 | Altwasser |
| 6,996,818 | B2 * | 2/2006 | Jacobi ...................... G06F 8/658 717/170 |
| 7,047,448 | B2 | 5/2006 | Rao et al. |
| 7,082,549 | B2 | 7/2006 | Rao et al. |
| 9,148,744 | B2 * | 9/2015 | Velusamy ............... H04W 4/50 |
| 2007/0021116 | A1 * | 1/2007 | Okita ........................ G06F 8/65 455/428 |
| 2008/0263539 | A1 * | 10/2008 | Kawano .................... G06F 8/65 717/173 |
| 2015/0040114 | A1 * | 2/2015 | Miyama ................ G06F 16/219 717/170 |
| 2016/0055068 | A1 | 2/2016 | Jeansonne et al. |

FOREIGN PATENT DOCUMENTS

| | | |
|---|---|---|
| GB | 2512256 | 9/2014 |
| WO | 2007055686 | 5/2007 |

\* cited by examiner

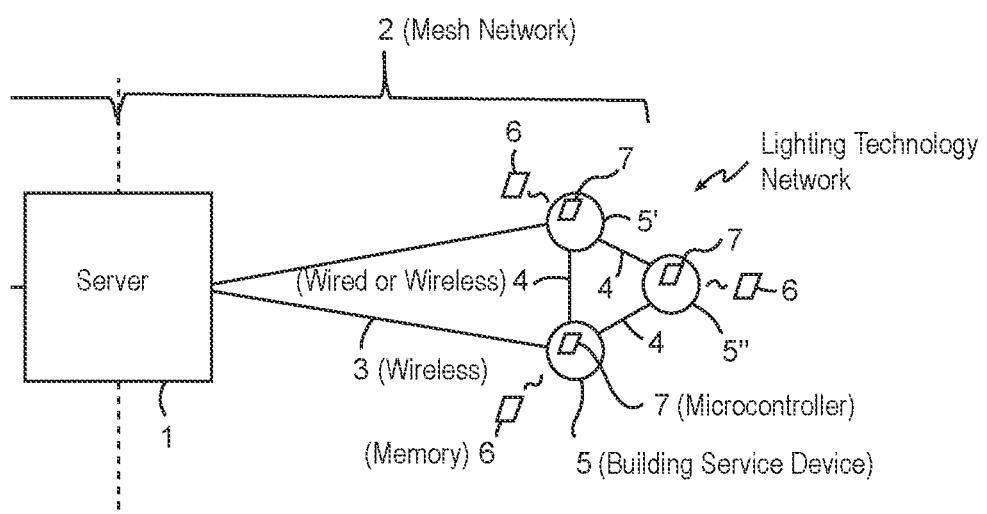

FIRMWARE OVER-THE-AIR (FOTA) UPDATE FOR BUILDING SERVICES

CROSS REFERENCE TO RELATED APPLICATIONS

The present application is the U.S. national stage application of international application PCT/EP2018/061030 filed Apr. 30, 2018, which international application was published on Nov. 15, 2018 as International Publication WO 2018/206337 A1. The international application claims priority to German Patent Application 10 2017 207 871.5 filed May 10, 2017.

FIELD OF THE INVENTION

The invention relates to the field of so-called firmware over-the-air (FOTA), and more specifically to the use of this approach in the field of building services, in particular in lighting technology installations.

BACKGROUND OF THE INVENTION

The Firmware over-the-air (FOTA) is known per se, and is defined in https://de.wikipedia.org/wiki/Firmware_Over-the-Air as follows: "Firmware over-the-air (FOTA) is a method of uploading new system software (firmware) to mobile devices via a wireless interface (for example via Wi-Fi or a cellular network) . . . after calling a function named "update service", for example, the new firmware is transmitted via the air interface and then installed".

FOTA is the subject matter of the Documents U.S. Pat. Nos. 6,785,707, 6,832,373, 6,941,453, 6,978,453, 6,996,818, 7,047,448 and 7,082,549.

Firmware over-the-air (FOTA) in the field of building services, in particular in lighting technology installations, has the special feature that the intent is to update the firmware of an entire installation and, at the same time, the backward compatibility could be interrupted.

The invention relates in particular to so-called mesh networks, which are defined in https://de.wikipedia.org/wiki/Vermaschtes_Netz as follows: "In a mesh network, each network node is connected to one or more others. The information is passed from node to node until it reaches the destination."

The invention therefore proposes an approach for how to adapt a firmware over-the-air (FOTA) update to the technical boundary conditions in the field of building services, in particular in lighting technology installations.

This object is achieved by the features of independent claims. The dependent claims further develop the central concept of the invention in a particularly advantageous manner.

SUMMARY OF THE INVENTION

A first aspect of the invention relates to a firmware over-the-air (FOTA) method for updating building services, in particular lighting technology installations, with multiple devices which are connected to a server as a mesh network.

The method comprises the following steps:
storing a firmware update image sent by the server in a respective memory of each device,
triggering the copying of the firmware update from the memory to an internal memory of a microcontroller of each of the devices by means of a trigger command issued by the server,
wherein, within a predefined time period (timeout) after the trigger command is issued, the server uses feedback from the devices to check whether each device has received the firmware update image and the trigger command, and wherein the copying does not takes place until after the predefined time period has elapsed.

The server can check whether all devices can boot with the firmware update within a further predefined time period, in that each device connects to the server after booting with the firmware update.

Each device which has connected to the server after the firmware update can wait for an activation command from the server for the future use of the firmware by a boot loader of the device.

A device which does not receive an activation command can replace the firmware update in the internal memory with a golden copy of the firmware. The term "golden copy" is well known in the firmware field and refers to a version of the firmware, the compatibility and function of which are secured. If necessary, the firmware update can later become a new golden copy once the compatibility and function of the firmware update are secured.

If the check is negative with respect to at least one device, the firmware over-the-air update can be aborted by the server within the predefined time period (timeout).

The invention also relates to a system for firmware over-the-air updating of building services, in particular lighting technology installations, comprising a server and a device, respectively designed to support a method of the abovementioned type.

The invention further relates to a building service device, in particular a lighting technology device such as an operating device for lamps, designed to support a method of the abovementioned type.

Further features, advantages and characteristics of the present invention will now be explained with reference to the FIGURE of the accompanying drawings.

BRIEF DESCRIPTION OF THE DRAWINGS

FIG. 1 shows a building services network, in particular a lighting technology network, in the form of a mesh network as it can be used in the invention.

DETAILED DESCRIPTION

FIG. 1 very generally shows a mesh network 2, which substantially consists of a server 1 and building services devices 5, 5' and 5". In a preferred design example, these building services devices are devices of a lighting technology network, and are therefore typically actuators (operating devices for lamps) and/or sensors (light sensors, motion detectors, etc.) of such a lighting technology network.

The server 1 is connected to the mentioned devices 5, 5' and 5" via a wireless connection 3. The devices are otherwise also interconnected with one another via wired communication lines 4, but preferably wirelessly.

As mentioned, the invention relates to how a firmware over-the-air (FOTA) update can be carried out for all or a part of said devices 5, 5' and 5", and also starting from the server 1.

The procedure according to the invention is as follows:
1. A firmware update image is transmitted from the server 1 via the wireless link 3 to all of the devices 5, 5' and 5" that require a firmware update. The devices 5, 5' and 5" store said firmware update image in an "external" memory 6 allocated to a respective device 5, 5' and 5". "External" memory means that this is not the actual (flash) memory of a microcontroller 7 that is provided in each of the devices 5, 5' and 5", but rather a memory that is external to the microcontroller 7.

2. The server 1 can then check whether the firmware update image has actually been downloaded by all of the devices 5, 5' and 5" that require an update. It is possible that all of the devices of network 2 require an update, or only a subgroup of them.

3. The server 1 issues a trigger command that triggers the actual firmware update process in the devices. The actual firmware update process consists of copying the firmware update image from the external, preferably flash, memory 6 to the internal memory, preferably flash memory, of the microprocessors 7 of the devices 5, 5' and 5".

It is provided, however, that this actual firmware update, i.e. copying to the internal memory, is not carried out by the devices immediately after receiving a trigger command. Rather, the server 1 checks whether a confirmation has been received within a predefined time period, also referred to as the timeout period, from all of the devices requiring a firmware update, that the firmware update image has been downloaded, and also that the trigger command has been received. The devices 5, 5', 5" are configured to not execute this actual firmware update until after the predefined time period has elapsed.

This predefined timeout period therefore makes it possible to ensure that the devices 5, 5', 5" are able to boot with the new firmware update within a predefined further time period.

This timeout period according to the invention thus allows the server 1 to abort the update process within this time period, if said check regarding the confirmation of the download (download of the firmware update image) and the receipt of the trigger command shows an error with respect to at least one device. Otherwise, there would be the risk that the relevant device 5, 5', 5" is no longer able to compatibly communicate with the other devices and/or the server after the failed firmware update.

4. If the firmware update process has not been aborted by the server 1 within the predefined time period, all of the devices 5, 5', 5" that require a firmware update copy the firmware update image from the external memory to the internal memory. The devices then reboot and start up with the new firmware update image.

5. As soon as the devices have rebooted with the new firmware update, they connect to the server 1 via the wireless interface 3 and wait for an activation command from the server 1 regarding the future use of the firmware update. When this activation command is received, the devices 5, 5', 5" interpret it as a confirmation for the new firmware, which will then be used by the so-called boot loader when booting for each new startup of the devices 5, 5', 5". According to https://de.wikipedia.org/wiki/Boot-loader, a boot loader is "also known as startup program[1] or initial program loader[2], . . . a special software, which is usually loaded by the firmware of a computer from a bootable medium and then executed".

6. If the activation command from the server 1 is not received before the next reboot of the devices, however, the boot loader of each device 5, 5', 5" that has not received the activation command replaces the firmware update in the internal memory of the microprocessors 7 of the devices 5, 5', 5" with the so-called golden copy of the firmware, i.e. a secured, stored and tested executable and compatible version of the firmware.

The use of the timeout period is of particular importance in the present case, because it may be a firmware update of an entire installation in which the backward compatibility can be interrupted.

The predefined timeout period allows a synchronization of the various devices to take place during the firmware update process. A reliable firmware update process can thus be achieved, even with a relatively unreliable medium such as a mesh network.

According to the invention, therefore, a firmware over-the-air (FOTA) method for updating building services, in particular lighting technology installations takes place, which comprises multiple devices (5, 5', 5") that are connected to a server (1) as a mesh network (2), wherein the method comprises the following steps:

storing a firmware update image sent by the server (1) in a respective external memory (6) of each device, triggering the copying of the firmware update from the external memory (6) to an internal memory (7) of a microcontroller of each of the devices (5, 5', 5") by means of a trigger command issued by the server (1), wherein, within a predefined time period (timeout) after the trigger command is issued, the server uses feedback from the devices (5, 5', 5") to check whether each device (5, 5', 5") has received the firmware update image and the trigger command from the server (1), and wherein the copying does not take place until after the predefined time period has elapsed.

The server (1) can be designed to check whether all devices (5, 5', 5") can boot with the firmware update within a further predefined time period, in that each device (5, 5', 5") connects to the server (1) after booting with the firmware update.

Each device (5, 5', 5") which has connected to the server (1) after the firmware update can wait for an activation command for the future use of the firmware by a boot loader of the device (5, 5', 5"). A device (5, 5', 5") which does not receive an activation command can replace the firmware update in the internal memory with a golden copy of the firmware.

If the check is negative with respect to at least one device, the firmware over-the-air update can be aborted by the server within the predefined time period (timeout).

The invention also relates to a system for firmware over-the-air updating of building services, in particular lighting technology installations, comprising a server and a device, respectively designed to support a method according to any one of the preceding Claims.

A building service device, in particular a lighting technology device such as an operating device for lamps, designed to support a method according to the invention is thus made possible as well.

What is claimed is:

1. A method for firmware over-the-air (FOTA) update building services in particular lighting technology installations, comprising multiple devices which are connected to a server as a mesh network, the method comprising:

storing a firmware update image sent by the server in a respective external memory of each of the multiple devices; and triggering a copying of the firmware update image from the respective external memory to an internal memory of a microcontroller of each of the multiple devices by a trigger command issued by the server wherein, within a predefined time period (timeout) after the trigger command is issued, the server uses feedbacks from the multiple devices to check whether each of the multiple devices has received the firmware update image and the trigger command from the server, and wherein the copying of the firmware update image does not take place until after the predefined time period has elapsed, wherein, if the server check is negative with respect to at least one device of the multiple devices, the firmware over-the-air update is aborted by the server within the predefined time period (timeout); and wherein if a device of the multiple devices which does not receive an activation command for using the firmware by a boot loader of the device, replaces the firmware update image in the internal memory of the device with a golden copy of the firmware, wherein the golden copy of the firmware is a secured, stored and tested executable and compatible version of the firmware.

2. The method according to claim 1, wherein the server checks whether each of the multiple devices can boot with the firmware update within a further predefined time period, in that each of the multiple devices connects to the server after booting with the firmware update.

3. The method according to claim 2, in which each of the multiple devices which has connected to the server after the firmware update, is waiting for an activation command for future use of the firmware update by a boot loader of each of the multiple devices.

4. The method of claim 1 wherein each of the multiple devices is an operating device for lamps in the building services.

\* \* \* \* \*